US011682894B2

(12) United States Patent
Greither

(10) Patent No.: US 11,682,894 B2
(45) Date of Patent: Jun. 20, 2023

(54) ELECTRIC SAFETY CIRCUIT

(71) Applicant: HS Elektronik Systeme GmbH, Noerdlingen (DE)

(72) Inventor: Markus Greither, Augsburg (DE)

(73) Assignee: HS ELEKTRONIK SYSTEME GMBH, Nordlingen (DE)

( * ) Notice: Subject to any disclaimer, the term of this patent is extended or adjusted under 35 U.S.C. 154(b) by 128 days.

(21) Appl. No.: 17/218,237

(22) Filed: Mar. 31, 2021

(65) Prior Publication Data

US 2021/0320493 A1 Oct. 14, 2021

(30) Foreign Application Priority Data

Apr. 9, 2020 (DE) .......................... 102020109981.9

(51) Int. Cl.
*H02H 3/33* (2006.01)
*H02H 7/122* (2006.01)
*H02H 1/00* (2006.01)

(52) U.S. Cl.
CPC ........... *H02H 3/33* (2013.01); *B64D 2221/00* (2013.01); *H02H 1/0007* (2013.01); *H02H 7/1222* (2013.01); *H02J 2310/44* (2020.01)

(58) Field of Classification Search
CPC .... H02H 1/0007; H02H 1/0038; H02H 3/027; H02H 3/16; H02H 3/32; H02H 3/33; H02H 3/332; H02H 3/334; H02H 7/22; H02H 7/228; H02H 7/268; G01R 31/52
See application file for complete search history.

(56) References Cited

U.S. PATENT DOCUMENTS

| 4,371,832 A * | 2/1983 | Wilson .................. H02H 3/332 |
| | | 324/509 |
| 5,539,602 A | 7/1996 | Schmitz et al. |
| 5,811,965 A | 9/1998 | Gu |
| 8,218,274 B2 | 7/2012 | Hastings et al. |
| 9,859,085 B2 | 1/2018 | Rozman et al. |
| 2011/0153234 A1* | 6/2011 | Winterhalter .......... G01R 31/42 |
| | | 702/58 |

(Continued)

FOREIGN PATENT DOCUMENTS

| DE | 102013018950 A1 * | 5/2015 | ....... H01L 31/02021 |
| EP | 2337176 A2 | 6/2011 | |

(Continued)

OTHER PUBLICATIONS

Machine translation of DE-102013018950-A1. Obtained from internal USPTO database. (Year: 2015).*

(Continued)

*Primary Examiner* — Fred E Finch, III
(74) *Attorney, Agent, or Firm* — Cantor Colburn LLP

(57) ABSTRACT

An electric safety circuit for an aircraft DC power supply circuit includes a first electric line connecting a first electric pole of a main DC power supply with a first electric connector of an electric load; a second electric line connecting a second electric pole of the main DC power supply with a second electric connector of the electric load; at least one electric safety switch arranged in at least one of the first and second electric lines and configured for selectively interrupting any electric current flowing through said at least one electric line; a first electric coil arranged in the first electric line.

16 Claims, 2 Drawing Sheets

(56) References Cited

U.S. PATENT DOCUMENTS

| | | | |
|---|---|---|---|
| 2012/0112757 A1* | 5/2012 | Vrankovic | G01R 31/52 |
| | | | 324/509 |
| 2014/0153144 A1 | 6/2014 | Lacey et al. | |
| 2017/0110873 A1 | 4/2017 | Glovinski et al. | |
| 2018/0134408 A1* | 5/2018 | Handy | H02H 3/325 |

FOREIGN PATENT DOCUMENTS

| | | | |
|---|---|---|---|
| EP | 1408594 | B1 | 5/2013 |
| WO | 1999002997 | A2 | 1/1999 |

OTHER PUBLICATIONS

Extended European Search Report for International Application No. 21158103.8 dated Aug. 12, 2021, 8 pages.

* cited by examiner

ELECTRIC SAFETY CIRCUIT

FOREIGN PRIORITY

This application claims priority to German Patent Application No. 102020109981.9 filed Apr. 9, 2020, the entire contents of which is incorporated herein by reference.

TECHNICAL FIELD

The invention relates to an electric safety circuit for an aircraft DC power supply circuit. It further relates to an aircraft DC power supply circuit with such an electric safety circuit, and to an aircraft equipped with an aircraft DC power supply circuit comprising such an electric safety circuit.

BACKGROUND

Aircraft are usually equipped with electric circuits, in particular direct current (DC) circuits, including electric lines for supplying electrical power to a plurality of electric loads arranged in different parts of the aircraft. Malfunctions of the electric loads and/or of the electric lines, in particular malfunctions resulting in electric leak currents, may result in potential dangerous situations. Customary means for detecting electric leak currents, such as conventional fault-current circuit breakers, as they are known for AC circuits, however, do not work in combination with DC circuits.

It therefore is beneficial to provide an electric safety circuit for aircraft DC power supply circuit, which allows preventing dangerous situations caused by malfunctions in the aircraft DC power supply circuit.

SUMMARY

According to an exemplary embodiment of the invention, an electric safety circuit for an aircraft DC power supply circuit comprises: a first electric line connecting a first electric pole of a main DC power supply with a first electric connector of an electric load; a second electric line connecting a second electric pole of the main DC power supply with a second electric connector of the electric load; at least one electric safety switch arranged in at least one of the first and second electric lines and configured for selectively interrupting any electrical current flowing through said at least one electric line; a first electric coil arranged in the first electric line; a second electric coil arranged in the second electric line; an electric detection coil, wherein the first and second electric coils and the electric detection coil are in inductive interaction with each other, wherein the first and second electric coils and the electric detection coil in particular are arranged on a common magnetic core; and a detection circuit electrically connected with the detection coil and configured for detecting electric voltages induced in the detection coil and for controlling the at least one electric safety switch to open in case the detected voltage exceeds a predetermined limit. The electric safety circuit further comprises a first coil switch serially connected with the first coil for selectively switching a first electrical current flowing through the first coil on and off, and a second coil switch serially connected with the second coil for selectively switching a second electrical current flowing through the second coil on and off; and a control circuit connected with the first and second coil switches and configured for intermittently switching the first and second coil switches on and off.

Exemplary embodiments of the invention further include an aircraft DC power supply circuit with an electric safety circuit according to an exemplary embodiment of the invention; and an aircraft equipped with such an aircraft DC power supply circuit.

Intermittently switching the coil switches of the electric safety circuit on and off results in variations of the electric currents flowing through the respectively associated electric coils. The varying electric currents generate varying electromagnetic fields inducing electric voltages in the detection coil. The electric coils are configured such that in normal operation, i.e. without a malfunction being present, when the absolute values of the electric currents flowing through the two electric lines are equal, the voltages simultaneously induced in the detection coil cancel each other, so that no resulting voltage is detected at the detection coil.

However, when a malfunction of the electric load and/or a leakage at one of the electric lines results in a difference between the absolute values of electric currents flowing through the two electric lines, a detectable voltage is induced in the detection coil. The induced voltage is a function of the difference between the absolute values of the electric currents; the induced voltage in particular may be proportional to the difference between the absolute values of the electric currents. Thus, the detection circuit is capable to detect a malfunction in the aircraft DC power supply circuit by monitoring the voltage induced in the detection coil, and to switch-off the aircraft DC power supply circuit if the induced voltage exceeds the predetermined limit thereby indicating the presence of a malfunction, in particular of an electric leak current, in the aircraft DC power supply circuit.

Intermittently switching the coil switches includes repeatedly switching the coil switches on and off, in particular periodically switching the coil switches on and off. Exemplary embodiments of the invention, however, are not restricted to a periodic switching of the coil switches, since any intermittent switching of the coil switches will achieve the desired result of inducing a detectable voltage within the detection coil.

Particular embodiments may include any of the following optional features, alone or in combination with other features:

The electric safety circuit may further comprise a serial combination of a third electric coil and a third coil switch connected serially with each other, wherein the serial combination of the third electric coil and the third coil switch is connected in parallel to the serial combination of the first electric coil and the first coil switch; and a serial combination of a fourth electric coil and a fourth coil switch connected serially with each other, wherein the serial combination of the fourth electric coil and the fourth coil switch is connected in parallel to the serial combination of the second electric coil and the second coil switch. In such an embodiment, the control circuit is configured for switching the third coil switch alternately with the first coil switch and for switching the fourth coil switch alternately with the third coil switch.

Alternately switching the first and third coil switches and the second and fourth coil switches, respectively, means that the third and fourth coil switches are switched off when the first and second coil switches are switched on, and that the third and fourth coil switches are switched on when the first and second coil switches are switched off. All four coil switches are simultaneously switched between their respective switching states. As a result, electric power is always supplied to the electric load independently of the switching states of the coil switches; in other words, the electric load is continuously supplied with electric power from the main DC power supply.

Each of the coil switches may include at least one transistor. The at least one transistor may be any of a field effect transistor, a bipolar transistor, and an insulated gate bipolar transistor. Transistors such as field effect transistors, bipolar transistors, and insulated gate bipolar transistors provide efficient and reliable switches, which are capable to switch the currents flowing through the electric coils with the desired frequencies.

A first diode may be connected parallel to the serial combination of the first coil and the first coil switch; and a second diode may be connected parallel to the serial combination of the second coil and the second coil switch. Such optional diodes allow bypassing the coil switches in case of a malfunction of any of said coil switches. This enhances the operational reliability of the aircraft DC power supply circuit 10.

The electric safety circuit may further comprise at least one coil switch damping circuit, which is configured for damping the switching of at least one of the coil switches in order to reduce undesirable spikes in the switched electric currents and the resulting induced voltages. Such spikes may disturb the functionality of the electric load and/or other electric components within the aircraft.

The electric safety circuit may also comprise a detection damping circuit, which is configured for damping the voltage induced in the detection coil in order to prevent the occurrence of a malfunction of the detection circuit caused by undesirable spikes within the voltage induced in the detection coil. The electric safety circuit in particular may comprise a short-cut circuit, which is configured for intermittently, in particular periodically, short-cutting the detection coil in order to prevent undesirable spikes within the voltage induced in the detection coil.

The electric safety circuit may comprise two safety switches, with one safety switch being arranged in one of the two electric lines, respectively. In such a configuration, the control circuit may be configured for switching both safety switches, in particular for simultaneously switching both safety switches, in order to interrupt both electric lines when a malfunction is detected. Providing two safety switches enhances the safety of the aircraft DC power supply circuit, in particular in case of an aircraft DC power supply circuit including a symmetric main DC power supply which causes the potentials of both electric lines to differ from a common ground potential.

The control signals supplied to the coil switches may be galvanically separated from the control circuit. The control circuit in particular may include at least one power supply, which is galvanically separated from the control circuit. This allows providing the potentials needed for reliably switching the coil switches independently of the voltages supplied by the main DC power supply. It in particular allows reliably providing the right potential differences, which are necessary for switching transistors, in particular field effect transistors.

The control circuit may be configured for periodically switching the coil switches with a frequency in a range of 50 Hz to 500 Hz, more particularly with a frequency in a range of 100 Hz to 400 Hz. Frequencies in this range have been found as a reasonable compromise between the size of the voltages induced in the detection coil, the necessary size of electromagnetic cores arranged within the coils, and possible electromagnetic disturbances caused by the switching operations.

The detection circuit may be configured for controlling the at least one electric safety switch to open in case the detected voltage corresponds to a difference in the electric currents of at least 50 mA, in particular to a difference of at least 30 mA. A detection limit in the range of 30 mA to 50 mA provides the necessary safety of the aircraft DC power supply circuit without causing the aircraft DC power supply circuit to be switched off too often due to false alarms.

The detection circuit may be configured for controlling the at least one electric safety switch to open in case the detected voltage exceeds the predetermined limit for at least 35 ms. Opening the at least one electric safety switch after 35 ms provides the necessary safety of the aircraft DC power supply circuit without causing the aircraft DC power supply circuit to be switched off too often due to false alarms.

In an aircraft DC power supply circuit according to an exemplary embodiment of the invention, the electric voltage provided by the main DC power supply may be in the range of 12 V to 550 V and/or the currents supplied by the main DC power supply may be in the range of 0.1 A to 100 A, in particular in the range of 1 A to 10 A. These are typical values of the voltages and currents occurring in aircraft DC power supply circuits.

In an aircraft DC power supply circuit according to an exemplary embodiment of the invention, the main DC power supply may be a symmetric electric power supply, i.e. an electric power supply providing positive and negative voltages with respect to a common ground potential. In such a configuration, the first electric line may be connected to a plus pole of the main DC power supply and the second electric line may be connected to a negative pole of the main DC power supply, respectively.

BRIEF DESCRIPTION OF THE DRAWINGS

In the following, an exemplary embodiment of the invention is described with reference to the enclosed figures, wherein.

DETAILED DESCRIPTION

Figure 1:
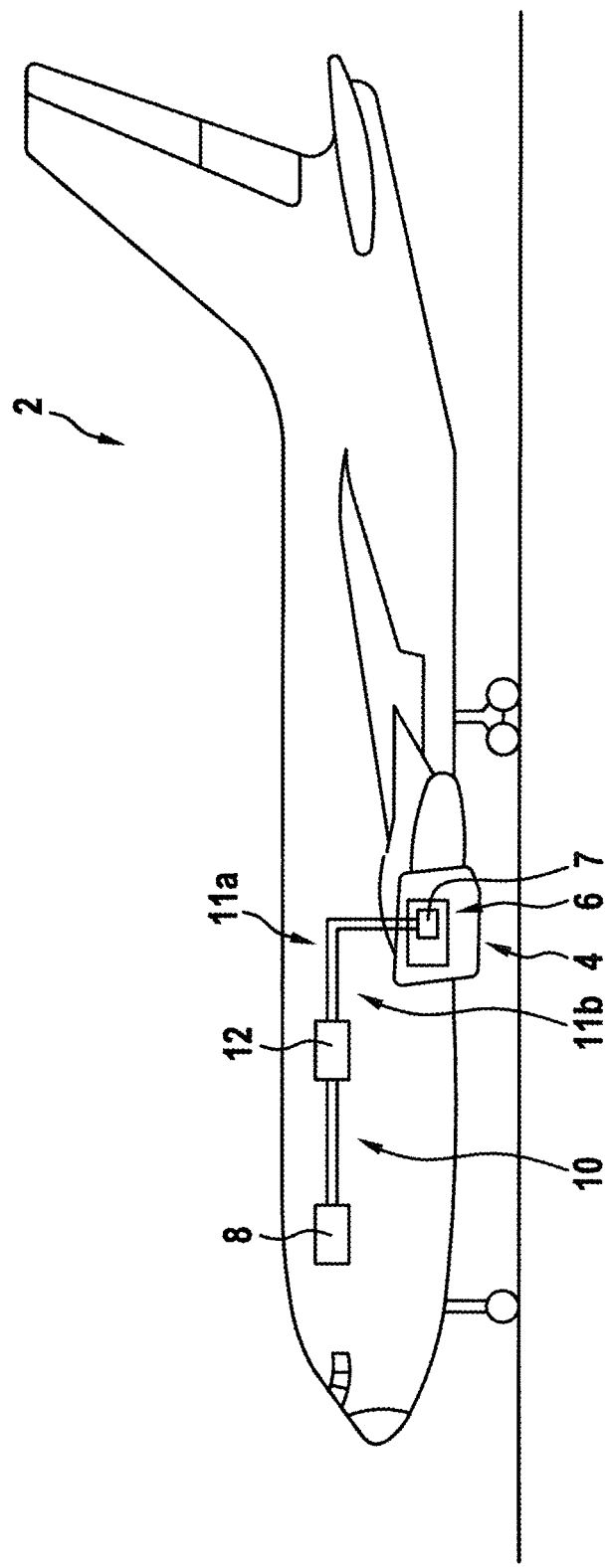
FIG. 1 shows a schematic side view of an aircraft, which is equipped with an aircraft DC power supply circuit according to an exemplary embodiment of the invention.

FIG. 1 shows a schematic side view of an aircraft 2, in particular of an airplane, comprising at least one engine 4 and at least one electric power supply ("main DC power supply") 6, which may be driven by the at least one engine 4. The at least one main DC power supply 6 includes a rectifier 7 for providing an electric DC power output.

The aircraft 2 further comprises at least one electric load 8 electrically connected with the main DC power supply 6 by means of two electric lines 11a, 11b. The main DC power supply 6, the electric lines 11a, 11b and the at least one electric load 8 constitute an aircraft DC power supply circuit 10.

In order to provide safety in case of a malfunction of the at least one electric load 8 and/or the electric lines 11a, 11b, the aircraft DC power supply circuit 10 further comprises an electric safety circuit 12. The electric safety circuit 12 is configured for monitoring the electric currents $I_+$, $I_-$ flowing through the electric lines 11a, 11b, comparing the electric currents $I_+$, $I_-$ flowing through the electric lines 11a, 11b with each other, and switching the electric power off in case a difference ΔI between the absolute values of the electric currents $I_+$, $I_-$ flowing through the electric lines 11a, 11b exceeds a predetermined limit $I_{limit}$ ($\Delta I > I_{limit}$).

Figure 2:
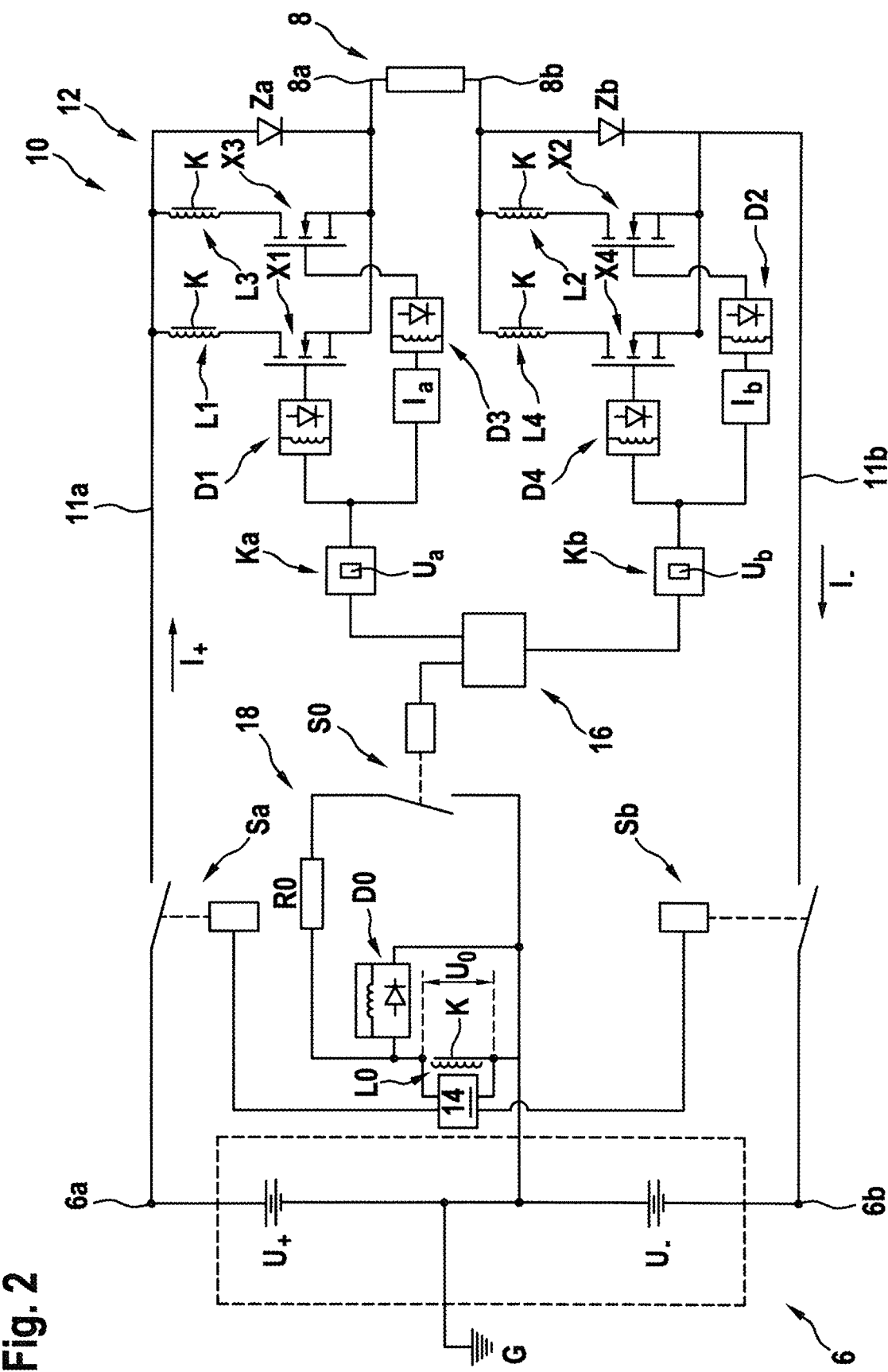
FIG. 2 shows a schematic circuit diagram of an electric safety circuit according to an exemplary embodiment of the invention.

FIG. 2 depicts a schematic circuit diagram of an aircraft DC power supply circuit 10 comprising an electric safety circuit 12 according to an exemplary embodiment of the invention.

The aircraft DC power supply circuit 10 comprises the first electric line 11a connecting a first electric pole 6a of the main DC power supply 6 with a first electric connector 8a of the electric load 8; and the second electric line 11b connecting a second electric pole 6b of the main DC power supply 6 with a second electric connector 8b of the electric load 8.

In the exemplary embodiment depicted in FIG. 2, the main DC power supply 6 is a symmetric power supply providing positive and negative voltages $U_+$, $U_-$ with respect to a common ground G.

The electric voltages $U_+$, $U_-$ provided by the main DC power supply 6 may be in the range of +/−12 V to +/−270 V. The currents $I_+$, $I_-$ supplied by the main DC power supply may be in the range of 0.1 A to 100 A, in particular in the range of 1 A to 10 A.

An electric safety switch $S_a$, $S_b$ is arranged in each of the first and second electric lines 11a, 11b, respectively. The electric safety switches $S_a$, $S_b$ are configured for selectively interrupting any electrical currents $I_+$, $I_-$ flowing through the respective electric line 11a,11b. The electric safety switches $S_a$, $S_b$ may be electromagnetic switches, in particular relays, or electronic switches, in particular semiconductor switches comprising transistors or similar semiconductor devices.

A first electric coil L1 and a third electric coil L3 are arranged connected parallel with each other in the first electric line 11a, and a second electric coil L2 and a fourth electric coil L4 are arranged connected parallel with each other in the second electric line 11b, respectively. As a result, any electric currents $I_+$, $I_-$ flowing between the main DC power supply 6 and the electric load 8 flow through the electric coils L1-L4 as well.

The electric safety circuit 12 further comprises an electric detection coil L0. The first to fourth electric coils L1-L4 and the electric detection coil L0 are in inductive interaction with each other. In consequence, any change of an electric current $I_+$, $I_-$ flowing through any of the four electric coils L1-L4 induces an inductive voltage $U_0$ within the detection coil L0.

The first to fourth electric coils L1-L4 and the detection coil L0 in particular may be wound around a common magnetic core K. Alternatively, the coils L0, L1-L4 may be wound on different magnetic cores K which are configured for magnetically interacting with each other.

A detection circuit 14 is electrically connected with the detection coil L0. The detection circuit 14 is configured for detecting electric voltages $U_0$ induced within the detection coil L0. The detection circuit 14 is further configured for controlling the two safety switches Sa, Sb to open thereby interrupting the electric currents $I_+$, $I_-$ flowing through the electric lines 11a, 11b, when the detected electric voltage $U_0$ exceeds a predetermined limit $U_{limit}$.

In an aircraft DC power supply circuit 10, however, differences ΔI between the electric currents $I_+$, $I_-$ flowing through the two electric lines 11a, 11b do not induce an electric voltage $U_0$ in the detection coil L0.

For detecting differences ΔI between the electric currents $I_+$, $I_-$ flowing through the two electric lines 11a, 11b of the aircraft DC power supply circuit 10, the electric safety circuit 12 comprises a first coil switch X1 serially connected with the first coil L1, a second coil switch X2 serially connected with the second coil L2, a third coil switch X3 serially connected with the third coil L3, and a fourth coil switch X4 serially connected with the fourth coil L4.

Each of the coil switches X1-X4 is configured for selectively switching the electrical current $I_+$, $I_-$ flowing through the respectively associated electric coil L1-L4 on and off. The coil switches X1-X4 may be semiconductor switches, in particular including transistors, more particularly bipolar transistors, insulated gate bipolar transistors, or field effect transistors ("FETs").

Optionally, a first diode Za is connected parallel to the serial combinations of the first and third coils L1, L3 with the first and third coil switches X1, X3; and a second diode Zb is connected parallel to the serial combinations of the second and fourth coils L2, L4 with the second and fourth coil switches X2, X4, respectively.

The optional diodes Za, Zb allow bypassing the coil switches X1-X4 and supplying electric power to the electric load 8 in case at least one of the coil switches X1-X4 fails.

A control circuit 16 is functionally coupled via electric coupling circuits Ka, Kb to the coil switches X1-X4. The control circuit 16 is configured for controlling the coil switches X1-X4 to intermittently switch on and off.

The electric coupling circuits Ka, Kb are configured for providing the electric potentials or potential differences, which are necessary for operating the coil switches X1-X4, independently of the main DC power supply 6. The electric coupling circuits Ka, Kb in particular may be configured for galvanically separating the input lines of the coil switches X1-X4 from the control circuit 16. The electric coupling circuits Ka, Kb in particular may include at least one electric power supply $U_a$, $U_b$, respectively, for providing the electric power used for operating the coil switches X1-X4.

Inverters $I_a$, $I_b$, which are configured for inverting the control signals provided by the control circuit 16, are arranged between the control circuit 16 and the second and third coil switches X2, X3, respectively. As a result, the first and third coil switches X1, X3 arranged in the first electric line 11a are switched alternately with respect to each other. Similarly, the second and fourth coil switches X2, X4 arranged in the second electric line 11b are switched alternately with respect to each other.

I.e. in a first switching state, the first and second coil switches X1, X2 are closed allowing electric currents $I_+$, $I_-$ to flow trough the first and second electric coils L1, L2, and the third and fourth coil switches X3, X4 are open preventing electric currents $I_+$, $I_-$ from flowing through the third and fourth electric coils L3, L4.

In a second switching state, the third and fourth coil switches X3, X4 are closed allowing currents to flow trough the third and fourth electric coils L3, L4, and the first and second coil switches X1, X2 are open preventing electric currents $I_+$, $I_-$ from flowing through the first and second electric coils L1, L2.

The first to fourth coil switches X1-X4 are switched between their respective switching states at the same time. As a result, either the first and second coil switches X1, X2 or the third and fourth coil switches X3, X4 are closed at any point of time. In consequence, electric power from the main DC power supply 6 is continuously supplied to the electric load 8.

In a simplified configuration of the electric safety circuit 12, which is not depicted in the figures, the third and fourth electric coils L3, L4 and the associated third and fourth coil switches X3, X4 may be omitted. In such a simplified configuration, the electric load 8 is not continuously supplied with electric power from the main DC power supply 6. In particular, the supply of electric power to the electric load 8 is interrupted, when the first and second coil switches X1, X2 are switched off. As a result, the electric power supplied to the electric load 8 is pulsed in correspondence with the switching of the first and second coil switches X1, X2.

Intermittently, in particular periodically, switching the coil switches X1-X4 on and off causes varying electric currents to flow through the respectively associated electric coils L1-L4. The varying electric currents generate varying electromagnetic fields inducing electric voltages $U_0$ in the detection coil L0.

The electric coils L1-L4 are configured such that in case the absolute values of electric currents $I_+$, $I_-$ flowing through the two electric lines 11a, 11b are equal, the voltages, which are simultaneously induced by the electric coils L1-L4 in the detection coil L0, cancel each other and no resulting voltage $U_0$ is detected at the detection coil L0.

However, when a malfunction of the electric load 8 and/or a leakage at one of the electric lines 11a, 11b results in a difference $\Delta I$ between the absolute values of the electric currents $I_+$, $I_-$ flowing through the two electric lines 11a, 11b, a detectable voltage $U_0$ is induced in the detection coil L0. The induced voltage $U_0$ is a function of the difference $\Delta I$ between the absolute values of the electric currents $I_+$, $I_-$; the induced voltage $U_0$ usually is proportional to the difference $\Delta I$ between the absolute values of the electric currents $I_+$, $I_-$.

The detection circuit 14 is configured to switch off the electric safety switches Sa, Sb interrupting the electric currents $I_+$, $I_-$ when the voltage $U_0$ detected at the detection coil L0 exceeds a predetermined limit $U_{limit}$, which corresponds to a predetermined difference $\Delta I_{limit}$ between the absolute values of the electric currents $I_+$, $I_-$.

The detection circuit 14 in particular may be configured to open the electric safety switches Sa, Sb if the detected voltage $U_0$ corresponds to a difference $\Delta I$ between the absolute values of the electric currents of at least 50 mA, in particular to a difference of at least 30 mA.

The detection circuit 14 in particular may be configured for controlling the electric safety switches Sa, Sb to open in case the detected voltage $U_0$ exceeds the predetermined limit $U_{limit}$ for at least 35 ms.

The control circuit 16 may be configured for periodically switching the coil switches X1-X4, in particular for periodically switching the coil switches X1-X4 with a frequency f in a range of 50 Hz to 500 Hz, more particularly with a frequency f in a range of 100 Hz to 400 Hz.

Raising the switching frequency f allows reducing the size of the magnetic core(s) K of the coils L0, L1-L4.

Raising the switching frequency f, however, also increases the generation of undesirable spikes in the electric currents $I_+$, $I_-$ and induced voltages $U_0$. Such spikes may disturb the functionality of the electric load 8 and/or other electric components within the aircraft 2, and negatively impact the accuracy of the differential current measurement.

The electric safety circuit 12 therefore comprises additional elements for reducing the occurrence of such spikes.

The electric safety circuit 12 in particular includes damping elements D1-D4, which are arranged in the control lines of the coil switches X1-X4 and configured for damping the control signals delivered to the coil switches X1-X4. A further damping element D0 is electrically connected parallel to the detection coil L0.

Said damping elements D0, D1-D4 in particular may be passive damping elements including passive electric components such as inductivities and/or diodes.

Additionally, an active damping circuit ("short-cut circuit") 18 may be electrically connected parallel to the detection coil L0.

The short-cut circuit 18 comprises a bypass resistor RO and a bypass switch S0, which are serially connected with each other and parallel to the detection coil L0. The bypass switch S0 is repeatedly activated, i.e. closed, by the control circuit 16 for short-cutting the detection coil L0.

The bypass switch S0 in particular is periodically closed with the same frequency f as the coil switches X1-X4 are switched, creating a dead-time after each transition of, for example 50 µs, with respect to the coil switches X1-X4. This reduces the occurrence of undesirable spike in the voltage U0 induced within the detection coil L0 by periodically short-cutting the detection coil L0. In order to allow switching the bypass switch S0 with the desired frequency and low latency, the bypass switch S0 preferably is a semiconductor switch, in particular a semiconductor switch including at least one transistor. The at least one transistor may be any of a field effect transistor, a bipolar transistor, and an insulated gate bipolar transistor.

While the invention has been described with reference to exemplary embodiments, it will be understood by those skilled in the art that various changes may be made and equivalents may be substituted for elements thereof without departing from the scope of the invention. In addition, many modifications may be made to adopt a particular situation or material to the teachings of the invention without departing from the essential scope thereof. Therefore, it is intended that the invention is not limited to the particular embodiments disclosed, but that the invention includes all embodiments falling within the scope of the claims.

The invention claimed is:

1. An electric safety circuit for an aircraft DC power supply circuit, the electric safety circuit comprising:
    a first electric line connecting a first electric pole of a main DC power supply with a first electric connector of an electric load;
    a second electric line connecting a second electric pole of the main DC power supply with a second electric connector of the electric load;
    at least one electric safety switch arranged in at least one of the first and second electric lines and configured for selectively interrupting any electric current flowing through said at least one electric line;
    a first electric coil in the first electric line, and a second electric coil arranged in the second electric line; and
    an electric detection coil, wherein the first and second electric coils and the electric detection coil are in inductive interaction with each other, wherein the first and second electric coils and the electric detection coil in particular are arranged on a common magnetic core;
    a detection circuit electrically connected with the electric detection coil and configured for detecting electric voltages induced in the electric detection coil and for controlling the at least one electric safety switch to open in case the detected voltage exceeds a predetermined limit;
    a first coil switch serially connected with the first electric coil;
    a second coil switch serially connected with the second electric coil;
    a control circuit connected with the first and second coil switches and configured for intermittently switching the first and second coil switches on and off;

a serial combination of a third electric coil and a third coil switch connected serially with each other, wherein the serial combination of the third electric coil and the third coil switch is connected in parallel to the serial combination of the first electric coil and the first coil switch; and a serial combination of a fourth electric coil and a fourth coil switch connected serially with each other, wherein the serial combination of the fourth electric coil and the fourth coil switch is connected in parallel to the serial combination of the second electric coil and the second coil switch;

wherein the control circuit is configured for switching the third coil switch alternately with the first coil switch and for switching the fourth coil switch alternately with the third coil switch.

2. The electric safety circuit according to claim 1, wherein each of the coil switches includes at least one transistor, in particular any of a field effect transistor, a bipolar transistor, and an insulated gate bipolar transistor.

3. An aircraft DC power supply circuit comprising:
a main DC power supply;
at least one electric load; and
an electric safety circuit according to claim 2.

4. The electric safety circuit according to claim 1, further comprising:
a first diode connected parallel to the serial combination of the first electric coil and the first coil switch; and
a second diode connected parallel to the serial combination of the second electric coil and the second coil switch.

5. An aircraft DC power supply circuit comprising:
a main DC power supply;
at least one electric load; and
an electric safety circuit according to claim 4.

6. The electric safety circuit according to claim 1, further comprising at least one coil switch damping circuit configured for damping the switching of at least one of the coil switches.

7. The electric safety circuit according to claim 1, further comprising a detection damping circuit configured for damping the voltage induced in the detection coil.

8. The electric safety circuit according to claim 1, further comprising a short-cut circuit configured for intermittently or periodically, short-cutt the detection coil.

9. The electric safety circuit according to claim 1, including two safety switches, wherein each safety switch is arranged in one of the electric lines, respectively; and wherein the control circuit is configured for switching both safety switches simultaneously off.

10. The electric safety circuit according to claim 1, wherein the control signals supplied to the coil switches are galvanically separated from the control circuit;

wherein the control circuit in particular includes at least one power supply, which is galvanically separated from the control circuit.

11. The electric safety circuit according to claim 1, wherein the control circuit is configured for periodically switching the coil switches, in particular for periodically switching the coil switches with a frequency in a range of 50 Hz to 500 Hz.

12. The electric safety circuit according to claim 1, wherein the voltage detected by the detection circuit corresponds to a difference of the absolute values of the electric currents flowing through the first and second electric lines and the detection circuit is configured for controlling the at least one electric safety switch to open in case the detected voltage corresponds to a difference in the electric currents of at least 50 mA.

13. The electric safety circuit according to claim 1, wherein the detection circuit is configured for controlling the at least one electric safety switch to open in case the detected voltage exceeds the predetermined limit for at least 35 ms.

14. An aircraft DC power supply circuit comprising:
a main DC power supply;
at least one electric load; and
an electric safety circuit according to claim 1.

15. The aircraft DC power supply circuit according to claim 14,
wherein the electric voltage provided by the main DC power supply is in the range of 12 V to 550 V or the currents supplied by the main DC power supply are in the range of 0,1 A to 100 A;
wherein the main DC power supply is a symmetric power supply providing a positive voltage and a negative voltage with respect to a common ground;
wherein the first electric line is connected to a plus pole of the main DC power supply and the second electric line is connected to a negative pole of the main DC power supply, respectively.

16. An aircraft comprising:
an aircraft DC power supply circuit to claim 14.

* * * * *